United States Patent
Qi et al.

(10) Patent No.: US 12,450,933 B2
(45) Date of Patent: Oct. 21, 2025

(54) METHOD, DEVICE, COMPUTER EQUIPMENT AND STORAGE MEDIUM FOR IDENTIFYING ILLEGAL COMMODITY

(71) Applicant: ZHEJIANG LAB, Zhejiang (CN)

(72) Inventors: Yao Qi, Hangzhou (CN); Hongyang Chen, Hangzhou (CN); Jingsong Lv, Hangzhou (CN); Wentao Yang, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 288 days.

(21) Appl. No.: 18/460,680

(22) Filed: Sep. 4, 2023

(65) Prior Publication Data

US 2024/0331425 A1    Oct. 3, 2024

Related U.S. Application Data

(63) Continuation of application No. PCT/CN2023/086438, filed on Apr. 6, 2023.

(30) Foreign Application Priority Data

Apr. 3, 2023   (CN) .......................... 202310342924.9

(51) Int. Cl.
  *G06V 30/19*   (2022.01)
  *G06N 5/02*    (2023.01)
(52) U.S. Cl.
  CPC ......... *G06V 30/19187* (2022.01); *G06N 5/02* (2013.01); *G06V 30/19173* (2022.01)
(58) Field of Classification Search
  None
  See application file for complete search history.

(56) References Cited

U.S. PATENT DOCUMENTS

| 2014/0207469 A1* | 7/2014 | Dykstra-Erickson ...................... G10L 17/22 704/275 |
| 2014/0351261 A1 | 11/2014 | Aswani et al. |

(Continued)

FOREIGN PATENT DOCUMENTS

| CN | 102663025 A | 9/2012 |
| CN | 112200317 A | 1/2021 |

(Continued)

OTHER PUBLICATIONS

International Search Report (PCT/CN2023/086438); Date of Mailing: Jun. 23, 2023.

(Continued)

*Primary Examiner* — Helen Zong
(74) *Attorney, Agent, or Firm* — Wiersch Law Group

(57) ABSTRACT

A method, a device, computer equipment and a storage medium for identify an illegal commodity. The method comprises: firstly, constructing a multi-modal knowledge graph according to a multi-modal knowledge graph data set, and extracting visual features of all visual modality entities and text features of all text modality entities in the knowledge graph; then obtaining a commodity image and a commodity text according to a database; then, generating commodity visual feature according to the commodity image; then generating the commodity text feature according to the commodity text; secondly, according to the visual features and text features, as well as the commodity visual feature and the commodity text feature, linking the commodity image and the commodity text to the knowledge graph by using an entity linking method; finally, obtaining the correlation between the commodity image and the commodity text according to the linked knowledge graph to determine the illegality of the commodity.

10 Claims, 7 Drawing Sheets

(56) References Cited

U.S. PATENT DOCUMENTS

2018/0181592 A1\* 6/2018 Chen .................... G06N 3/08
2018/0197088 A1   7/2018 Bonin et al.
2022/0327809 A1\* 10/2022 Li ...................... G06F 40/284
2023/0367972 A1\* 11/2023 Zhao .................. G06V 20/70
2023/0368036 A1\* 11/2023 Trask ................. G06N 3/0464

FOREIGN PATENT DOCUMENTS

| CN | 113609892 A | 11/2021 |
| CN | 113836904 A | 12/2021 |
| CN | 114579747 A | 6/2022 |
| CN | 114840705 A | 8/2022 |
| CN | 114996455 A | 9/2022 |
| CN | 115048537 A | 9/2022 |
| CN | 115100664 A | 9/2022 |
| CN | 115481285 A | 12/2022 |

OTHER PUBLICATIONS

First Office Action(CN202310342924.9); Date of Mailing: May 10, 2023.
Notice Of Allowance(CN202310342924.9); Date of Mailing: May 22, 2023.
Research-on-Knowledge-Graph-Representation-Learning-Based-on-Associated-Text.
Exploring-Hierarchical-Language-Knowledge-in-Graph-Neural-Networks-for-Fake-News-Detection.

\* cited by examiner

METHOD, DEVICE, COMPUTER EQUIPMENT AND STORAGE MEDIUM FOR IDENTIFYING ILLEGAL COMMODITY

CROSS-REFERENCE TO RELATED APPLICATIONS

The present application is a continuation of International Application No. PCT/CN2023/086438, filed on Apr. 6, 2023, which claims priority to Chinese Application No. 202310342924.9, filed on Apr. 3, 2023, the contents of both of which are incorporated herein by reference in their entireties.

TECHNICAL FIELD

The present disclosure relates to the field of artificial intelligence, and in particular to a method, a device, a computer equipment and a storage medium for identifying an illegal commodity.

BACKGROUND

With the development of Internet technology, e-commerce has become an important part of people's daily life. However, with the rise of e-commerce, there are further many unscrupulous merchants selling illegal commodities on e-commerce platforms, such as protecting animal commodities and illegal drugs. When these illegal merchants put these commodities on the shelves, they will take means such metaphors, hints to avoid platform monitoring.

At present, the means to identify these illegal commodities and the existing problems are as follows:

A commodity thesaurus related to prohibited commodities is established, for example, establishing an illegality semantic database, and identifying illegality of the commodities by comparing commodity attribute information words with the illegality semantic database. The obvious defects of this method are as follows: merchants can easily change the words to avoid monitoring due to the illegality semantic database cannot cover all the implied words of illegal commodities; and the establishment cost of the illegality thesaurus is high; the method can only deal with known illegal words, but not to identify new cheating words of the merchants.

The supervised learning artificial intelligence model is adopted to learn the multi-modal features of illegal commodities. The obvious defects of this method are as follows: the labeling cost is high, and the method is only capable of dealing with the known situation, but not capable of identifying the new cheating words and pictures of the merchants.

SUMMARY

The present disclosure aims to provide a method, a device, computer equipment and a storage medium for identifying an illegal commodity in view of the shortcomings of the prior art. By introducing a knowledge graph, the present disclosure realizes reasonable inference of illegality of the commodity risk based on knowledge, and has obvious advantages of wide coverage, low cost, strong robustness and the like.

The object of the present disclosure is achieved through the following technical solution: a first aspect of the embodiment of the present disclosure provides a method for identifying an illegal commodity; the method includes the following steps.

(1) Constructing a multi-modal knowledge graph based on a multi-modal knowledge graph data set, and extracting visual features of all visual modality entities and text features of all text modality entities in the multi-modal knowledge graph.

(2) Acquiring commodity information based on a database, the commodity information comprises a commodity image and a commodity text, and the commodity text comprises at least one of a commodity title and a commodity description.

(3) Generating a commodity visual feature based on the commodity image.

(4) Generating a commodity text feature based on the commodity text.

(5) Linking the commodity image and the commodity text to the multi-modal knowledge graph constructed in the step (1) by adopting an entity linking method based on the visual features and the text features extracted in the step (1) as well as the commodity visual feature generated in the step (3) and the commodity text feature generated in the step (4).

(6) Acquiring a correlation between the commodity image and the commodity text based on the linked multi-modal knowledge graph obtained in the step (5) to determine the illegality of the commodity.

Alternatively, the multi-modal knowledge graph data set comprises Wikidata, DBpedia, YAGO, Concept and WordNet.

Alternatively, in the step (6), the step of acquiring a correlation between the commodity image and the commodity text based on the linked multi-modal knowledge graph obtained in the step (5) to determine the illegality of the commodity comprises: acquiring a shortest path from the commodity image to the commodity text in the linked knowledge graph, and determining the illegality of the commodity based on the shortest path.

Alternatively, the step of determining the illegality of the commodity based on the shortest path specifically comprises: acquiring a length of the shortest path based on the shortest path, comparing the length of the shortest path with a set length threshold, and determining that the commodity is illegal if the length of the shortest path is greater than the length threshold; otherwise, determining that the commodity is not illegal.

Alternatively, the step of determining the illegality of the commodity based on the shortest path specifically comprises: acquiring neighbor nodes of all nodes in the shortest path within k hops and edges connecting these neighbor nodes, and forming the subgraph together with the shortest path; acquiring the features of the nodes and the edges in the subgraph; constructing a discriminative model and training the discriminative model to acquire a trained discriminative model; and inputting the subgraph and the features of the nodes and the edges in the subgraph into the trained discriminative model for discrimination, so as to acquire the illegality of the commodity.

Alternatively, the discriminative model includes:

A graph convolution neural network with k layers or more configured to aggregate k-hop neighbor information of the nodes in the shortest path to the shortest path.

A sequence model configured to process the features of the nodes the edges in the shortest path after the k-hop neighbor information is aggregated, so as to acquire correlation features of the nodes in the shortest path.

A classifier configured to process sequence correlation features of the shortest path and provide a determination result of the illegality of the commodity.

Alternatively, the step of training the discriminative model to obtain the trained discriminative model includes the following steps:

(a1) Collecting commodity data based on the database to construct a training data set; and the training data set comprises a plurality of instances, and each of the instance comprises a commodity image, a commodity text and a label indicating the illegality of the commodity of a same commodity.

(a2) Randomly sampling a batch of instances from the training data set, linking the commodity image and the commodity text in every instance to a multi-modal knowledge graph, respectively, to acquire a batch of subgraphs, and inputting the subgraphs and the features of the nodes and the edges in the subgraphs in the instances into the constructed discriminative model to acquire a prediction result.

(a3) Calculating a loss based on the prediction result and the label indicating the illegality of the commodity of the instance in the training data set.

(a4) Updating parameters of the discriminative model by a back propagation method and a gradient descent method based on the loss calculated in the step (a3).

(a5) Repeating the step (a2) to the step (a4) until the loss converges to acquire the trained discriminative model.

A second aspect of the embodiment of the present disclosure provides a device for identifying an illegal commodity for implementing the above method for identifying an illegal commodity, the device includes:

A commodity information acquisition module configured for acquiring commodity information, the commodity information comprises a commodity image and a commodity text, and the commodity text comprises at least one of a commodity title and a commodity description.

An image feature extraction module configured for generating the commodity visual feature based on the commodity image.

A text feature extraction module configured for generating the commodity text feature based on the commodity text.

A linking module configured for linking the commodity image and the commodity text to the multi-modal knowledge graph based on the commodity visual feature and the commodity text feature.

A determination module configured for determining the illegality of the commodity based on the linked multi-modal knowledge graph.

A third aspect of the embodiment of the present disclosure provides a computer equipment, comprising a memory and a processor, the memory is configured for storing program data, and the processor is configured for executing the program data to implement the above method for identifying an illegal commodity.

A fourth aspect of the embodiment of the present disclosure provides a computer-readable storage medium on which a computer program is stored, the program, when executed by a processor, implements the above method for identifying an illegal commodity.

The method has the beneficial effects that by introducing the knowledge graph, the reasonable inference of illegality of the commodity risk is realized based on the knowledge graph, and it is no longer necessary to establish an illegality semantic database or learn the multi-modal features of illegal commodities, so that potential prohibited commodities can be simply and efficiently identified; it can be deployed on an e-commerce platform to generate economic value, which is beneficial to reducing costs; the present disclosure can not only deal with known illegal words, but also identify new commodity words and images by linking them to the knowledge graph, and has obvious advantages such as wide coverage, strong robustness and the like.

DESCRIPTION OF EMBODIMENTS

Reference will now be made in detail to exemplary embodiments, examples of which are illustrated in the accompanying drawings. When the following description refers to the drawings, unless otherwise indicated, the same numbers in different drawings indicate the same or similar elements. The embodiments described in the following exemplary embodiments do not represent all embodiments consistent with the present disclosure. Rather, they are merely examples of devices and methods consistent with some aspects of the present disclosure as detailed in the appended claims.

The terminology used in the present disclosure is for the purpose of describing specific embodiments only and is not intended to limit the present disclosure. The singular forms "a", "said" and "the" used in the present disclosure and the appended claims are also intended to include the plural forms, unless the context clearly indicates other meaning. It should further be understood that the term "and/or" as used herein refers to and includes any or all possible combinations of one or more associated listed items.

It should be understood that although the terms first, second, third, etc. may be used to describe various information in the present disclosure, this information should not be limited to these terms. These terms are only used to distinguish the same type of information from each other. For example, the first piece of information can further be called the second piece of information without departing from the scope of the present disclosure, and similarly, the second piece of information can further be called the first piece of information. Depending on the context, the word "if" as used herein can be interpreted as "when" or "in case of" or "in response to a determination".

The present disclosure will be described in detail with reference to the attached drawings. In the case of no conflict, the features in the following embodiments and implementations can be combined with each other.

Figure 1:
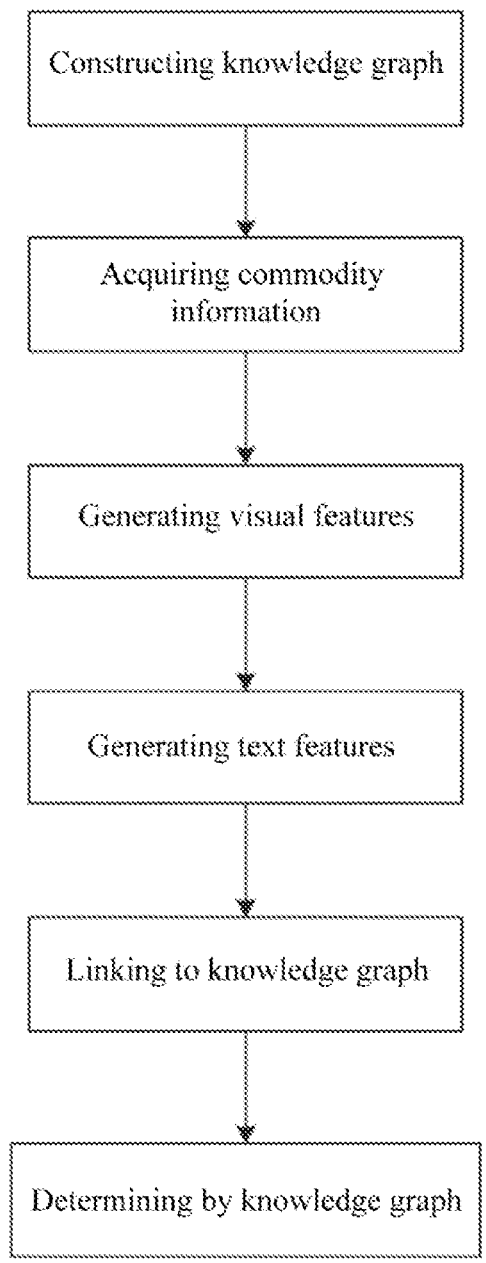
FIG. 1 is a flow chart of a method for identifying an illegal commodity according to the present disclosure.

Referring to FIG. 1, the illegal commodity identification method of the present disclosure includes the following steps:

(1) A multi-modal knowledge graph is constructed according to a multi-modal knowledge graph data set, and the visual features of all visual modality entities and text features of all text modality entities in the multi-modal knowledge graph are extracted.

In this embodiment, the multi-modal knowledge graph can be constructed by using a published multi-modal knowledge graph data set. Among them, the published multi-modal knowledge graph data sets include but are not limited to: Wikidata, DBpedia, YAGO, Concept, WordNet and other data sets, and one or more of them can be selected to construct the multi-modal knowledge graph, or the actual e-commerce data can be used to expand or build new multi-modal knowledge graphs.

In this embodiment, the visual features can be extracted by traditional machine learning algorithms, for example, the HOG (Histogram of Oriented Gradients) algorithm is used to extract the HOG features, and the LBP (Local Binary Pattern) algorithm is used to extract the LBP features, the LPQ (Local Phase Quantization) algorithm is used to extract LPQ features, and SIFT (Scale Invariant Feature Transform) algorithm is used to extract SIFT features; neural networks can further be used to extract visual features, for example, CNN (Convolutional Neural Network), ViT (Visual Transformer) and the like. The above features can further be combined for extraction. It should be understood that other methods of extracting visual features can be selected according to actual needs.

In this embodiment, traditional machine learning algorithms can be used to extract text features, for example, the BoW (Bags of Words) is used to extract text features; deep learning methods can further be used to extract text features, for example RNN (Recurrent Neural Network), GRU (Gate Recurrent Unit), LSTM (Long-Short Term Memory) network, Transformer, etc. The above features may further be combined. It should be understood that other methods of extracting text features can be selected according to actual needs.

(2) Commodity information is obtained according to the database. The commodity information includes a commodity image and a commodity text, and the commodity text includes at least one of a commodity title and a commodity description.

In this embodiment, the commodity information can be retrieved from the database of the e-commerce platform. It should be noted that the commodity information released by the merchant will go to the database of the e-commerce platform, from which the commodity information can be retrieved for the subsequent steps.

(3) The visual feature of a commodity is generated according to the commodity image.

In this embodiment, in step (1), the visual features of the visual modality entity in the multi-modal knowledge graph are extracted, and the same method is used to extract the visual features of the commodity image, that is, the algorithm for extracting the visual features of the commodity needs to be consistent with the algorithm for extracting the visual features of the visual modality entity in the multi-modal knowledge graph.

(4) The commodity text feature is generated according to the commodity text.

In this embodiment, in step (1), the text features of the text modality entity in the multi-modal knowledge graph are extracted, and the commodity text feature of the commodity text are extracted by the same method, that is, the algorithm for extracting the commodity text feature needs to be consistent with the algorithm for extracting the text features of the text modality entity in the multi-modal knowledge graph.

(5) According to the visual features and text features extracted in step (1), the commodity visual feature generated in step (3) and the commodity text feature generated in step (4), the commodity image and commodity text are linked to the multi-modal knowledge graph constructed in step (1) by using an Entity Linking (EL) method.

In this embodiment, the Entity Linking (EL) method can be used to link the commodity image and commodity text to the multi-modal knowledge graph constructed in step (1). It should be understood that entity linking can accurately link the commodity image or commodity text corresponding to the feature into the multi-modal knowledge graph according to the corresponding feature.

Illustratively, commodity images and commodity texts can be linked into multi-modal knowledge graphs by using feature similarity. Taking linking the commodity image as an example, the similarity between the commodity visual feature and the visual features of all visual modality entities in the multi-modal knowledge graph can be calculated, and then the commodity image is linked to the entity with the highest similarity in the multi-modal knowledge graph. Among them, the similarity can be a cosine similarity or other similarities that can reflect whether the features are close. In addition, in order to avoid the long time-consuming linking operation caused by too many instances in the multi-modal knowledge graph, the visual entities in the multi-modal knowledge graph can be clustered first. First, the clustering cluster with the highest similarity to the commodity visual feature is determined according to the features of the clustering center and the commodity visual feature, and then the entity with the highest similarity to the commodity visual feature is determined among the entities in the cluster. It should be understood that clustering and alignment can be performed for multiple times.

(6) According to the linked multi-modal knowledge graph obtained in step (5), the correlation between the commodity image and the commodity text is obtained to determine the illegality of the commodity.

It should be noted that there are physical world entities (including image entities and text entities) and the relationship between them in the multi-modal knowledge graph. According to the positions of the image and text of the commodity in the multi-modal knowledge graph, whether the commodity is illegal or not can be determined. For a normal and compliant commodity, the merchants who publish it will generally set the title and commodity picture according to the facts, that is to say, the commodity image and commodity text are matched, and there will be a close relationship after linking them to the multi-modal knowledge graph. If the image and text of the same commodity are linked to the multi-modal knowledge graph, they are far apart in the multi-modal knowledge graph, then the merchant who published the commodity has a high probability of metaphorical operation on the title of the commodity, which means that the commodity may have the risk of illegality.

In this embodiment, the correlation between the image and the text of a commodity is distinguished by the multi-modal knowledge graph, which can effectively determine whether the merchant's behavior is normal, so as to determine the illegality risk of the commodity. This method has no restrictions on the cheating methods of merchants, so there is no problem of coverage, no problem of updating the cheating methods of merchants, and it can effectively identify the new cheating words and pictures of merchants.

After linking the commodity image and commodity text to the multi-modal knowledge graph, the method for determining whether the commodity is illegal or not can be determined according to the actual situation, such as compute capability, whether there is labeled data, etc. In other words, as long as it is a reasonable way to use the multi-modal knowledge graph and the linked commodity image and text, it can further effectively determine whether the commodity is illegal.

In some embodiments, the shortest path from the commodity image to the commodity text in the linked multi-modal knowledge graph can be obtained, and the correlation between the commodity image and the commodity text can be obtained, and then the illegality of the commodity can be determined according to the shortest path. It should be understood that the shortest distance from the commodity image to the commodity text, the features of nodes in the road and the features of edges can all reflect the correlation between the commodity graph and the commodity text, and according to the correlation, whether the merchants' behavior is normal or not can be effectively determined, so as to determine whether the commodity is illegal or not.

In a preferred embodiment, determining the illegality of the commodity according to the shortest path is specifically as follows: firstly, obtaining the length of the shortest path according to the shortest path, then comparing the length of the shortest path with the set length threshold, and determining the illegality of the commodity if the length of the shortest path is greater than the length threshold; otherwise, determining that the commodity is not illegal. This is an easy and fast method to identify an illegal commodity, and there is no model to be trained, and there is no problem of labeling cost.

Figure 2:
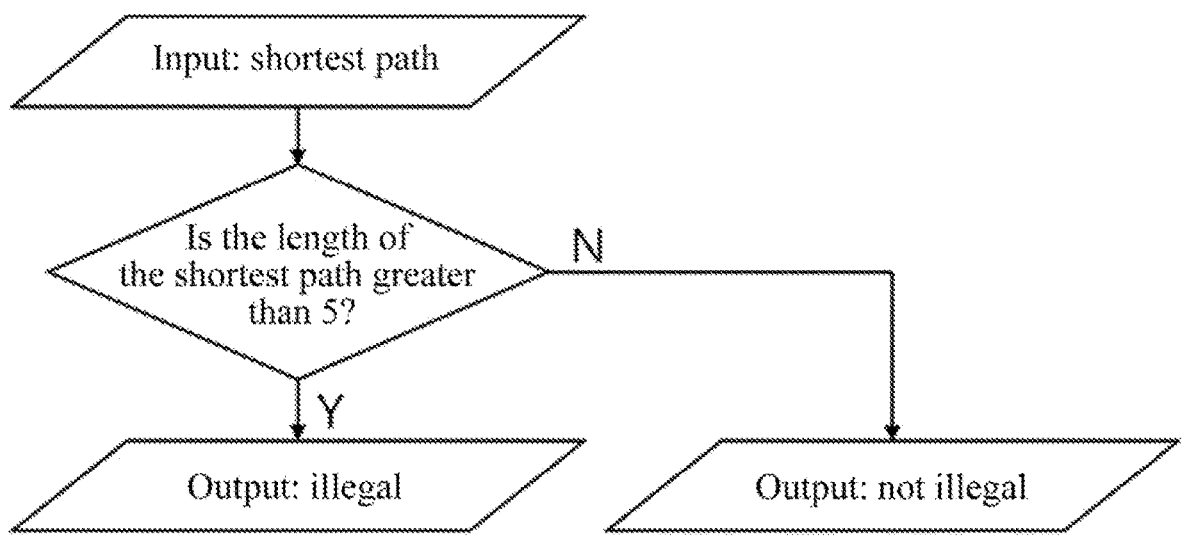
FIG. 2 is a flowchart of the illegal commodity determination according to the present disclosure.

For example, as shown in FIG. 2, the length threshold is set to 5, and if the length of the shortest path is greater than 5, the commodity is determined to be illegal; otherwise, it is determined that the commodity is not illegal. It should be understood that other suitable values can be selected for the length threshold according to the actual situation and experience.

Figure 3:
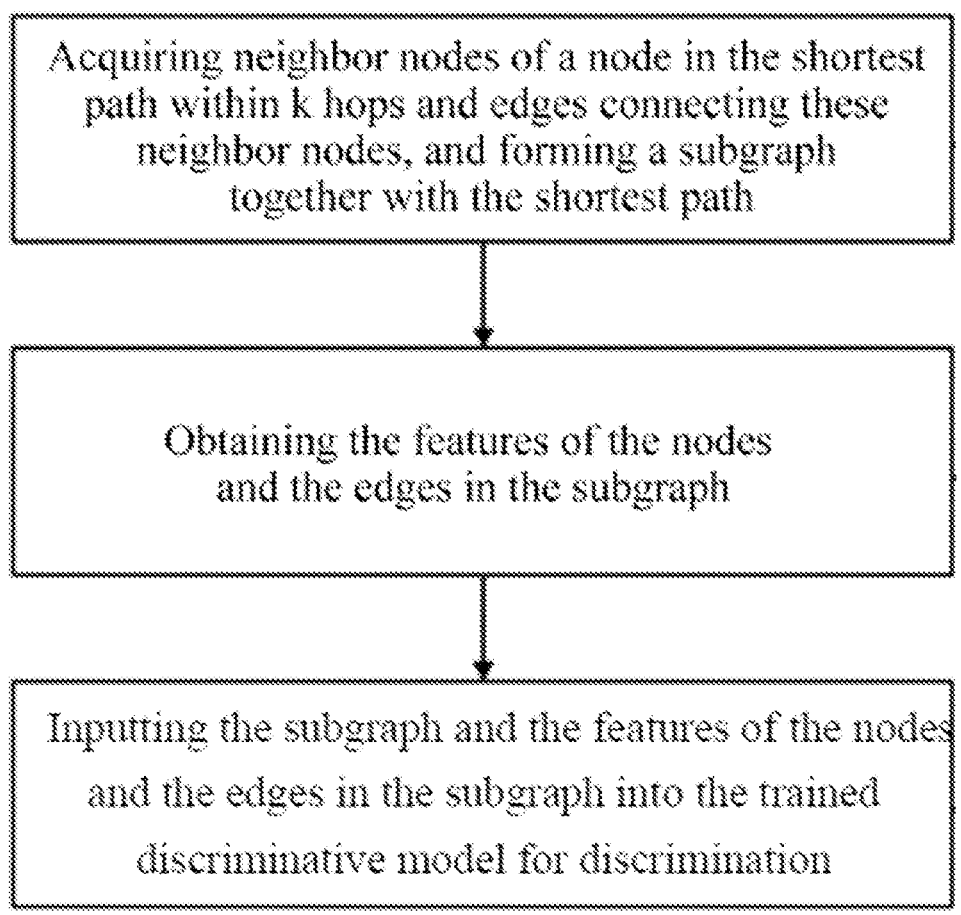
FIG. 3 is another flow chart of the illegal commodity determination according to the present disclosure.

In another preferred embodiment, determining the illegality of the commodity according to the shortest path specifically comprises the following steps: firstly, acquiring the neighbor nodes of a node in the shortest path within k hops and the edges connecting these neighbor nodes, and forming a subgraph together with the shortest path; then, obtaining the features of the nodes and the edges in the subgraph; then constructing a discriminative model and training the discriminative model to obtain a trained discriminative model; finally, inputting the subgraph and the features of the nodes and edges in the subgraph into the trained discriminative model for discrimination, so as to obtain the illegality of the commodity, as shown in FIG. 3. Among them, the features of nodes refer to visual features and text features, and the features of edges are embedding corresponding to the connection relationship, and the features of edges can further be extracted by the text feature extraction method. Through supervised machine learning and artificial intelligence algorithm model, combined with the features of nodes and edges on and around the shortest path, the illegality of the commodity is determined comprehensively.

In this embodiment, the discriminative model includes a graph convolution neural network with k layers or more, a sequence model and a classifier. The graph neural network with k layers or more is used to converge the k-hop neighbor information of the node in the shortest path to the shortest path; the sequence model is used to process the features of the node of the shortest path and edges after converging neighbor information, and further extract them to obtain the node correlation features on the shortest path; the classifier is used to process the sequence correlation features of the shortest path and provide the final determination, that is, the determination result of illegality of the commodity. It should be understood that the number of layers of the graph convolution neural network is greater than or equal to the k hops corresponding to the neighboring nodes.

Figure 4:
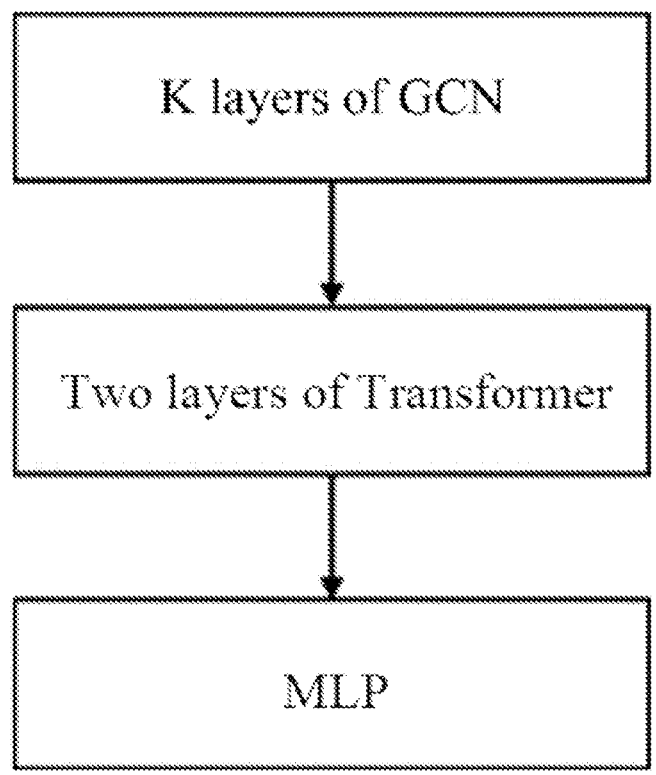
FIG. 4 is a schematic structural diagram of the discriminative model according to the present disclosure.

Illustratively, the discriminative model structure is shown in FIG. 4, which includes k layers of GCN (Graph Convolutional Networks), two layers of Transformer and MLP (Multi-Layer Perceptron). It should be understood that each layer of the network has a parameter, and the corresponding parameters will be different when different network layers are selected. When k=2, the subgraph and the features of the nodes and edges in the subgraph are input into the first layer GCN of the discriminative model, which is expressed as $G_1=GCN(G_0, w_1)$; the output result of the first layer GCN is then input to the second layer GCN, which is expressed as $G_2=GCN(G_1, w_2)$; the output result of the second layer GCN is then input to the first layer Transformer, which is expressed as $T_1=Tr(G_2, w_3)$; the output result of the first layer Transformer is then input to the second layer Transformer, which is expressed as $T_2=Tr(T_1, w_4)$; the output result of the second layer Transformer is then input to MLP, and finally the determination result is output, which is expressed as $p=MLP(T_2, w_5)$.

It should be understood that the GCN layer in the discriminative model can further be replaced by a GAT (Graph Attention Network) layer, a GIN (Graph Isomorphism Network) layer or other layers that can form a graph neural network; the two layers of Transformer can further be replaced by a LSTM (Long-Short Term Memory network), a RNN (Recurrent Neural Networks), a GRU (Gated Recurrent Unit) or other types of sequence models; MLP can further be replaced by a logistic regression model, a SVM (Support Vector Machine), a tree model or other types of classifiers; by combining these modules reasonably, a discriminative model can be formed, and illegality of the commodities can be identified through the discriminative model.

Figure 5:
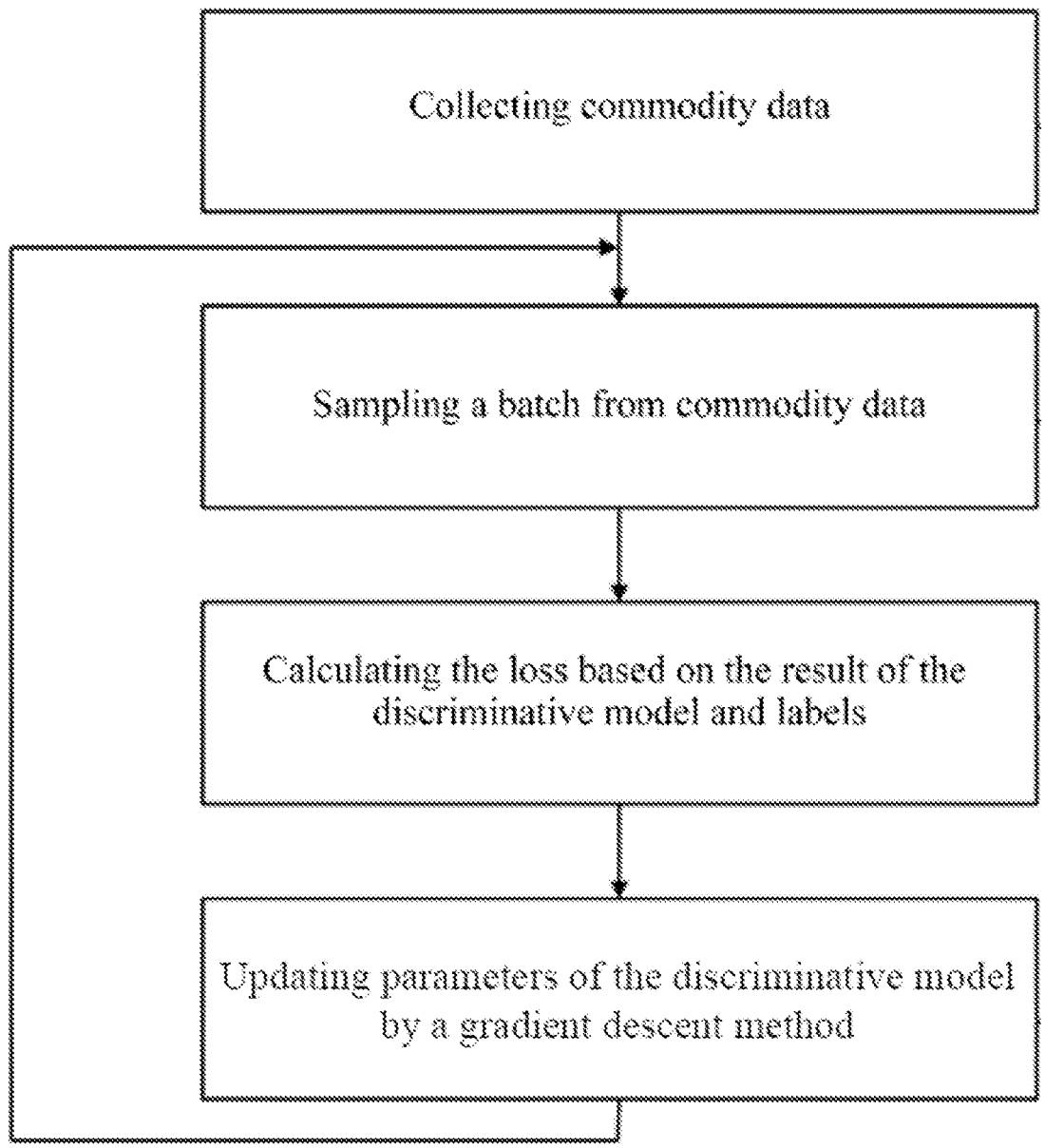
FIG. 5 is a training flow chart of the discriminative model according to the present disclosure.

In this embodiment, the discriminative model is pre-trained to obtain a trained discriminative model, as shown in FIG. 5, which specifically includes the following steps:

(a1) Collecting commodity data based on the database to construct a training data set; the training data set comprises a plurality of instances, and each of the instance comprises a commodity image, a commodity text and a label indicating the illegality of the commodity of a same commodity.

It should be understood that commodity data can be obtained from the database of an e-commerce platform, web crawler, etc., or from commodity information uploaded by merchants of the e-commerce platform.

(a2) Randomly sampling a batch of instances from the training data set, linking the commodity image and the commodity text in every instance to a multi-modal knowledge graph, respectively, to acquire a batch of subgraphs, and inputting the subgraphs and commodity texts and the features of the nodes and the edges in the subgraphs in the instances into the constructed discriminative model to acquire a prediction result;

In an embodiment, B instances are randomly selected from the training data set; for the commodity images and commodity texts in B instances, the above steps are repeated to generate corresponding commodity visual feature for the commodity images in the instances, and the corresponding commodity text feature for the commodity texts in the instances; according to the commodity visual feature and the commodity text feature, the commodity images and commodity texts in the instances are linked to the multi-modal knowledge graph by using the entity linking method to obtain the shortest path from the commodity images to the commodity texts and the corresponding subgraphs in the multi-modal knowledge graph, and subgraphs, edge features and node features of the subgraphs are input into the discriminative model to obtain the predicted illegality probability.

(a3) Calculating a loss based on the prediction result and the label indicating the illegality of the commodity of the instance in the training data set.

In this embodiment, the loss can be cross entropy, and the calculation method is as follows:

$$Loss = \frac{1}{B}\sum_{i=1}^{B} -[y_i \log p_i + (1-y_i)\log(1-p_i)]$$

where B is a batch size, which means that B instances are randomly selected from the training data set; $y_i \in \{0,1\}$ represents the illegality label; $p_i$ represents the illegality probability predicted by the model, and i represents the $i^{th}$ instance.

(a4) Updating parameters of the discriminative model by a back propagation method and a gradient descent method based on the loss calculated in the step (a3).

In an embodiment, the training data set is used for training under the initial parameters of the discriminative model, and the parameters of the discriminative model are updated by back propagation and a gradient descent method according to the losses calculated in step (a3); generally, the loss obtained by training with the initial parameters is generally large, so the gradient of parameters of the discriminative model can be calculated by a back propagation, and then the parameters of the discriminative model can be updated by gradient decent method.

(a5) Repeating the step (a2) to the step (a4) until the loss converges to acquire the trained discriminative model.

In this embodiment, the discriminative model can be repeatedly trained by setting the number of epochs, and the trained model can be obtained by stopping after reaching the number of epochs; step (a2)-step (a4) can further be repeated until the loss does not change, and the trained model can be obtained.

It should be understood that other solutions can be selected to determine whether the commodities are illegal according to the shortest path.

In other embodiments, the correlation between the commodity image and the commodity text can be obtained through a pre-set searchable dictionary, and then the illegality of the commodity can be determined.

In a preferred embodiment, a searchable dictionary can be set in advance, in which the key of the dictionary is an entity pair with two different modalities in the multi-modal knowledge graph, and the value is a number. For example, a visual modality entity I and a text modality entity T in the multi-modal knowledge graph form an entity pair, which is a "key", and the mapping (I, T)→p is stored in the dictionary, in which p is the "value" exists in the dictionary and reflects the degree of correlation between the visual modality entity I and the text modality entity T. The relationship between the two entities can be queried from the searchable dictionary through the entity pair composed of multi-modal entities linked by commodity images and texts. After the query, the degree of correlation is compared with a set length threshold, and if the correlation degree is less than the threshold, it is determined that the commodity is illegal; otherwise, it is determined that the commodity is not illegal.

In this embodiment, p is calculated in advance and stored in a dictionary, which can be the length of the shortest path in the previous embodiment, the prediction result of the discriminative model in the previous embodiment, or the calculation result of other algorithms, such as the average length of multiple paths from the commodity images to the commodity texts, sampling the subgraph containing commodity images and commodity texts, and calculating through a targeted discriminative model. It should be understood that the calculation can further be made in other ways.

In another preferred embodiment, the searchable dictionary only stores the entity pair consisting of the visual modality entity and text modality entity in case of illegality. If the entity pair linked to the commodity image and text can be found in the dictionary, the commodity is determined to be illegal, otherwise, it is determined not to be illegal.

It should be understood that other solutions can further be used to determine the illegality of commodity, as long as the multi-modal knowledge graph and the linked commodity image and text are reasonably used.

It is worth mentioning that the embodiment of the present disclosure further provides a device for identifying an illegal commodity.

Figure 6:
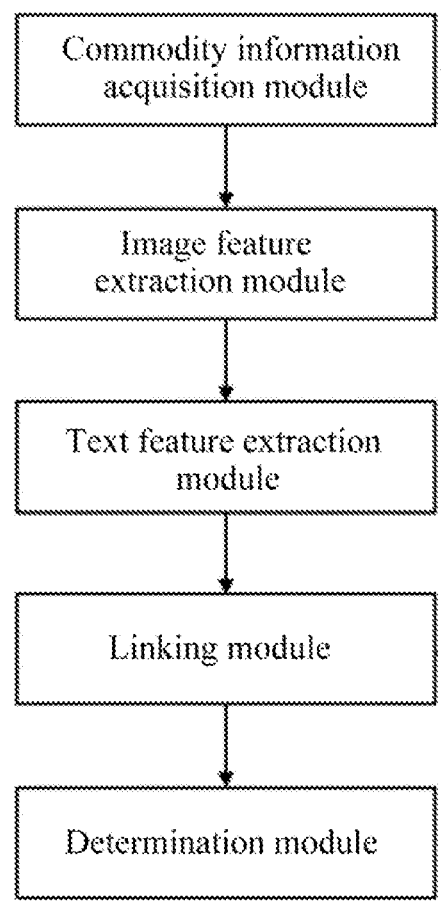
FIG. 6 is a schematic structural diagram of the device for identifying an illegal commodity according to the present disclosure.

Referring to FIG. 6, an illegal commodity identification device provided by an embodiment of the present disclosure includes a commodity information acquisition module, an image feature extraction module, a text feature extraction module, a linking module and a determination module.

In this embodiment, the commodity information acquisition module is used for acquiring commodity information according to a database, the commodity information comprises a commodity image and a commodity text, and the commodity text comprises at least one of a commodity title and a commodity description.

In this embodiment, the image feature extraction module is used for generating the commodity visual feature according to the commodity image.

In this embodiment, the text feature extraction module is used for generating the commodity text feature according to the commodity text.

In this embodiment, the linking module is used for linking the commodity image and the commodity text to the multi-modal knowledge graph according to the commodity visual feature and the commodity text feature.

In this embodiment, the determination module is used for determining the illegality of the commodity according to the linked multi-modal knowledge graph.

The implementing process of the functions and functions of each module in the above-mentioned identification device is detailed in the implementing process of the corresponding steps in the above-mentioned method, and will not be repeated here. It should be noted that the identification device provided in this embodiment is only illustrated by way of the division of the above-mentioned functional modules. In practical application, the above-mentioned functional allocation can be completed by different functional modules as required, that is, the internal structure can be divided into different functional modules to complete all or part of the above-mentioned functions.

Corresponding to the embodiment of the illegal commodity identification method, the present disclosure further provides an embodiment of computer equipment.

Figure 7:
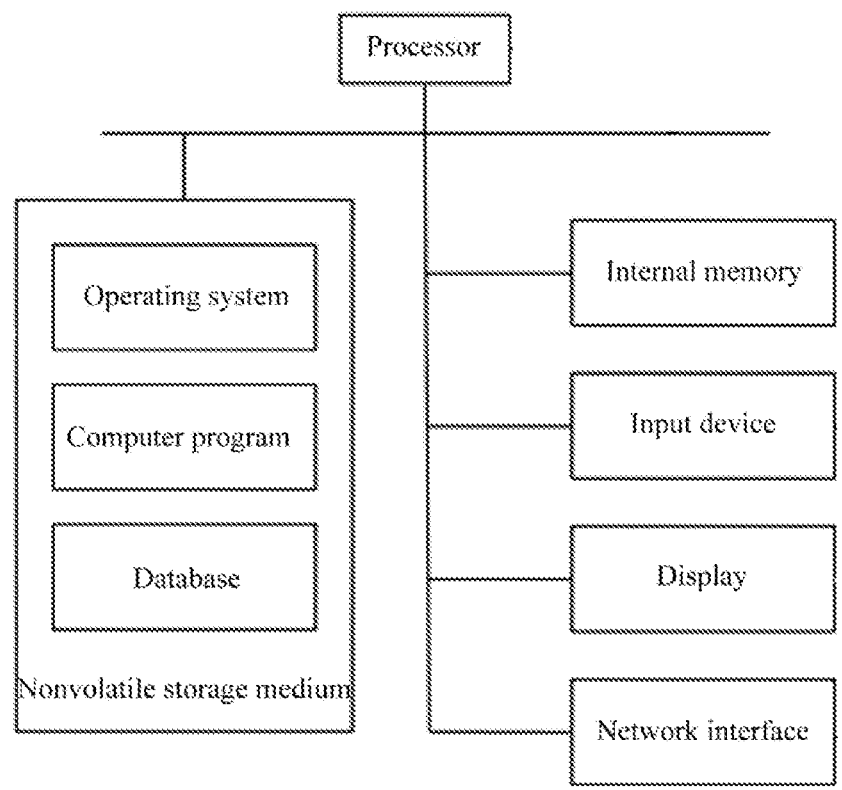
FIG. 7 is a structural block diagram of computer equipment according to the present disclosure.

Referring to FIG. 7, computer equipment provided by an embodiment of the present disclosure includes a memory and a processor; the memory is used for storing program data, and the processor is used for executing the program data to implement the above-mentioned method for identifying illegality of a commodity.

Embodiments of the computer equipment of the present disclosure can be applied to any device with data processing capability, which can be devices or devices such as computers. Embodiments of computer equipment can be realized by software, or by hardware or a combination of hardware and software. Taking software implementation as an example, as a logical device, it is formed by reading the corresponding computer program instructions in the nonvolatile memory into the memory through the processor of any equipment with data processing capability. From the hardware level, as shown in FIG. 7, it is a hardware structure diagram of any device with data processing capability where the computer equipment of the present disclosure is located. In addition to the processor, memory, network interface and nonvolatile memory shown in FIG. 7, any device with data processing capability where the computer equipment is located in the embodiment may further include other hardware according to the actual function of the device with data processing capability, which is not repeated here.

Further, when the computer equipment is a computer, as shown in FIG. 7, the computer equipment is connected with a processor, a memory, an input device, a display and a network interface through a system bus. The processor is used for providing calculation and control capabilities, and the memory includes a nonvolatile storage medium storing an operating system, a computer program and a database, and the internal memory provides an environment for the operation of the operating system and the computer program in the nonvolatile storage medium. When the processor executes the computer program stored in the memory, the method for identifying an illegal commodity is implemented.

The implementing process of the functions and functions of each unit in the above-mentioned computer equipment is detailed in the implementing process of the corresponding steps in the above-mentioned method, and will not be repeated here.

For the computer equipment embodiment, because it basically corresponds to the method embodiment, it is only necessary to refer to part of the description of the method embodiment for the relevant points. The embodiment of computer equipment described above is only schematic, in which the units described as separate components may or may not be physically separated, and the components displayed as units may or may not be physical units, that is, they may be located in one place or distributed to multiple network units. Some or all of the modules can be selected according to actual needs to achieve the purpose of the solution of the present disclosure. Those skilled in the art can understand and implement it without creative labor.

The embodiment of the present disclosure further provides a computer-readable storage medium, on which a program is stored, which, when executed by a processor, implements the method for identifying an illegal commodity in the above embodiment.

The computer-readable storage medium can be an internal storage unit of any device with data processing capability as described in any of the previous embodiments, such as a hard disk or a memory. The computer-readable storage medium can further be any device with data processing capability, such as a plug-in hard disk, a Smart Media Card (SMC), an SD card, a Flash Card and the like. The computer-readable storage medium can further be a computer-readable signal medium or a computer-readable storage medium or any combination of the two. Further, the computer-readable storage medium can further include both internal storage units and external storage devices of any device with data processing capability. The computer-readable storage medium is used for storing the computer program and other programs and data required by any equipment with data processing capability, and can further be used for temporarily storing data that has been output or will be output.

Further, the computer-readable storage medium includes, for example, but is not limited to, an electrical, magnetic, optical, electromagnetic, infrared or semiconductor system, device or device, or a combination of any of the above. More specific examples of computer-readable storage media may include, but are not limited to, an electrical connection with one or more wires, a portable computer disk, a random access memory (RAM), a read-only memory (ROM), an erasable programmable read-only memory (EPROM or flash memory), an optical fiber, a portable compact disk read-only memory (CDROM), an optical storage device, a magnetic storage device, or any suitable combination of the above.

The above embodiments are only used to illustrate the technical solution of the present disclosure, but not to limit it. Although the present disclosure has been described in detail with reference to the foregoing embodiments, those skilled in the art should understand that it is still possible to modify the technical solution described in the foregoing embodiments, or to replace some technical features with equivalents. However, these modifications or substitutions do not make the essence of the corresponding technical solutions deviate from the spirit and scope of the technical solutions of various embodiments of the present disclosure.

What is claimed is:

1. A method for identifying an illegal commodity for monitoring e-commerce platforms, comprising:
    step (1) constructing a multi-modal knowledge graph based on a multi-modal knowledge graph data set, and extracting visual features of all visual modality entities and text features of a text modality entities in the multi-modal knowledge graph;
    step (2) acquiring commodity information based on a database, wherein the commodity information comprises a commodity image and a commodity text, and the commodity text comprises at least one of a commodity title and a commodity description;
    step (3) generating a commodity visual feature based on the commodity image;
    step (4) generating a commodity text feature based on the commodity text;
    step (5) linking the commodity image and the commodity text to the multi-modal knowledge graph constructed in the step (1) using an entity linking method, based on the visual features and the text features extracted in the step (1) as well as the commodity visual feature generated in the step (3) and the commodity text feature generated in the step (4); and
    step (6) acquiring a correlation between the commodity image and the commodity text based on the linked multi-modal knowledge graph obtained in the step (5) to determine illegality of a commodity by a discriminator.

2. The method for identifying the illegal commodity according to claim 1, wherein the multi-modal knowledge graph data set comprises Wikidata, DBpedia, YAGO, Concept and WordNet.

3. The method for identifying the illegal commodity according to claim 1, wherein said acquiring the correlation between the commodity image and the commodity text based on the linked multi-modal knowledge graph obtained in the step (5) to determine the illegality of the commodity comprises: acquiring a shortest path from the commodity image to the commodity text in the linked multi-modal knowledge graph, and determining the illegality of the commodity based on the shortest path.

4. The method for identifying the illegal commodity according to claim 3, wherein said determining the illegality of the commodity based on the shortest path comprises: acquiring a length of the shortest path based on the shortest path, comparing the length of the shortest path with a set length threshold, and when the length of the shortest path is greater than the length threshold, determining that the commodity is illegal; and otherwise, determining that the commodity is not illegal.

5. The method for identifying the illegal commodity according to claim 3, wherein said determining the illegality of the commodity based on the shortest path comprises: acquiring neighbor nodes of all nodes in the shortest path within k hops and edges for connecting the neighbor nodes, and forming a subgraph together with the shortest path; acquiring features of nodes and edges in the subgraph; constructing a discriminative model and training the discriminative model to acquire a trained discriminative model; and inputting the subgraph and the features of the nodes and the edges in the subgraph into the trained discriminative model for discrimination, so as to acquire the illegality of the commodity.

6. The method for identifying the illegal commodity according to claim 5, wherein the discriminative model comprises:
a graph convolution neural network with k layers or more configured to aggregate a k-hop neighbor information of the nodes in the shortest path to the shortest path;
a sequence model configured to process the features of the nodes and the edges in the shortest path after the k-hop neighbor information is aggregated, so as to acquire correlation features of the nodes in the shortest path; and
a classifier configured to process sequence correlation features of the shortest path and provide a determination result of the illegality of the commodity.

7. The method for identifying the illegal commodity according to claim 5, wherein said training the discriminative model to acquire the trained discriminative model comprises:
sub-step (a1) collecting a commodity data based on a database to construct a training data set, wherein the training data set comprises a plurality of instances, and each of the instance comprises a commodity image, a commodity text and a label indicating whether the commodity is illegal of a same commodity;
sub-step (a2) randomly sampling a batch of instances from the training data set, linking the commodity image and the commodity text in every instance to a multi-modal knowledge graph, respectively, to acquire a batch of subgraphs, and inputting the subgraphs and the features of the nodes and the edges in the subgraphs in the instances into the constructed discriminative model to acquire a prediction result;
sub-step (a3) calculating a loss based on the prediction result and the label indicating whether the commodity of the instances in the training data set is illegal;
sub-step (a4) updating parameters of the discriminative model by a back propagation method and a gradient descent method based on the loss calculated in the sub-step (a3); and
sub-step (a5) repeating the sub-step (a2) to the sub-step (a4) until the loss converges to acquire the trained discriminative model.

8. A device for identifying an illegal commodity applied to implementing the method for identifying the illegal commodity according to claim 1, wherein the device comprises:
a commodity information acquisition module configured to acquire commodity information, wherein the commodity information comprises a commodity image and a commodity text, and the commodity text comprises at least one of a commodity title and a commodity description;
an image feature extraction module configured to generate a commodity visual feature based on the commodity image;
a text feature extraction module configured to generate a commodity text feature based on the commodity text;
a linking module configured to link the commodity image and the commodity text to a multi-modal knowledge graph based on the commodity visual feature and the commodity text feature; and
a determination module configured to determine the illegality of the commodity based on the linked multi-modal knowledge graph.

9. A computer equipment, comprising a memory and a processor, wherein the memory is configured to store program data, and the processor is configured to executing the program data to implement the method for identifying the illegal commodity according to claim 1.

10. A computer-readable storage medium on which a computer program is stored, wherein the program, when executed by a processor, is configured to implement the method for identifying the illegal commodity according to claim 1.

* * * * *